United States Patent [19]
Beaton

[11] 3,821,171

[45] June 28, 1974

[54] CONTINUOUS, SOLID-PHASE POLYMERIZATION OF POLYAMIDE GRANULES

[75] Inventor: Daniel Harper Beaton, Parkersburg, W. Va.

[73] Assignee: E. I. du Pont de Nemours and Company, Wilmington, Del.

[22] Filed: June 9, 1972

[21] Appl. No.: 261,212

Related U.S. Application Data

[63] Continuation-in-part of Ser. No. 158,900, July 1, 1971, abandoned.

[52] U.S. Cl. .......... 260/78 SC, 260/78 A, 260/7 SL
[51] Int. Cl. ............................................. C08g 20/38
[58] Field of Search ............. 260/78 SC, 78 L, 78 A

[56] References Cited
UNITED STATES PATENTS

| | | | |
|---|---|---|---|
| 2,130,948 | 9/1938 | Carothers | 260/78 R |
| 2,993,879 | 7/1961 | Gabler et al. | 260/78 SC |
| 3,155,637 | 11/1964 | Reichold et al. | 260/78 SC |
| 3,476,711 | 11/1969 | Muller et al. | 260/78 SC |
| 3,480,596 | 11/1969 | Simons | 260/78 SC |
| 3,562,206 | 2/1971 | Silverman et al. | 260/78 SC |

FOREIGN PATENTS OR APPLICATIONS

| | | |
|---|---|---|
| 1,804,552 | 10/1968 | Germany |
| 1,277,810 | 6/1972 | Great Britain |

Primary Examiner—Harold D. Anderson
Attorney, Agent, or Firm—Earl L. Handley

[57] ABSTRACT

A solid-phase polymerization process for preparing polyamide granules of increased molecular weight by heating the granules while they are uncompacted and then subjecting polyamide molding granules to controlled heating above 200°C. in a solid-phase, plug-flow, gravity-conveyed polymerization zone.

10 Claims, 1 Drawing Figure

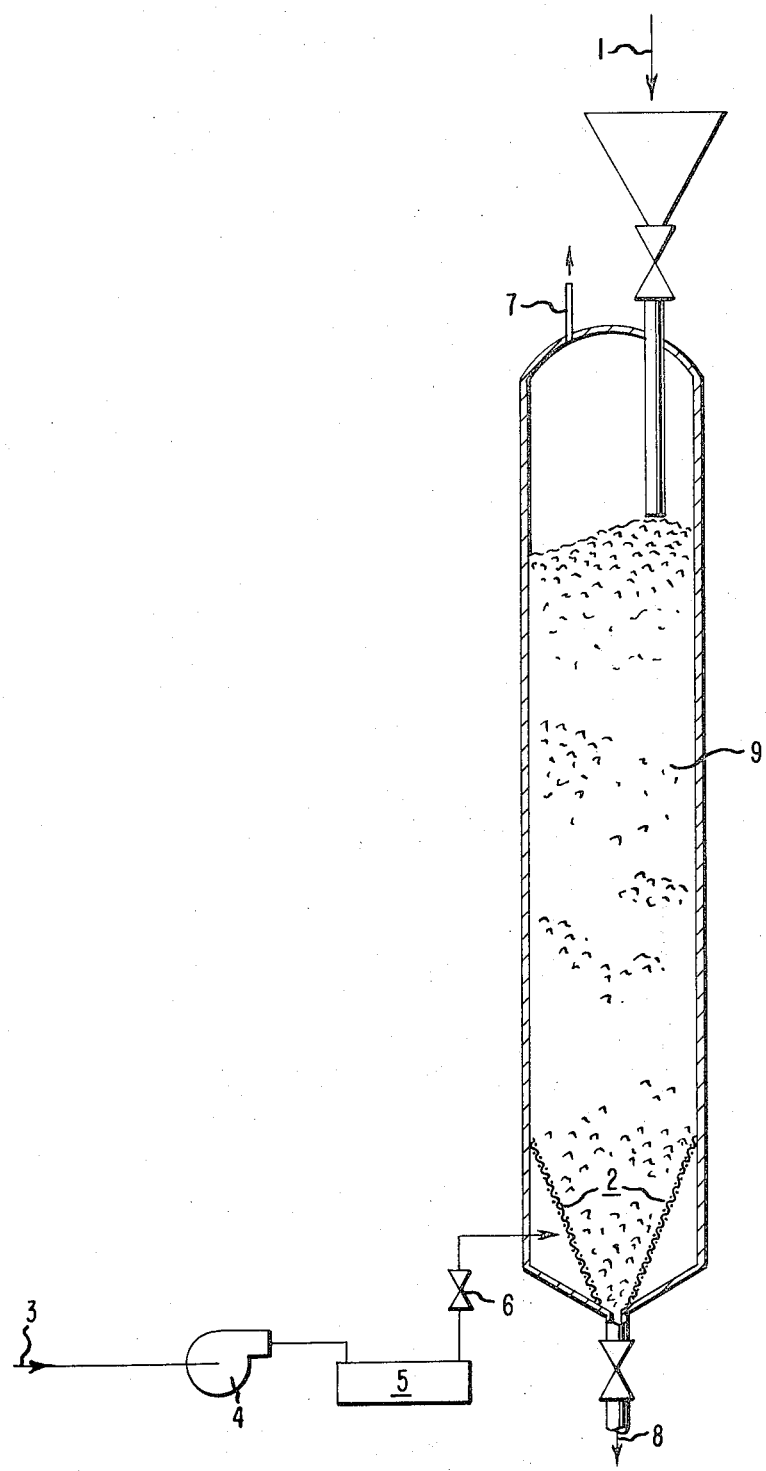

CONTINUOUS, SOLID-PHASE POLYMERIZATION OF POLYAMIDE GRANULES

SPECIFIC REFERENCE TO EARLIER FILED APPLICATION

This application is a continuation-in-part of U.S. application Ser. No. 158,900, filed July 1, 1971 now abandoned.

SUMMARY OF THE INVENTION

This invention relates to a solid phase polymerization process for polyamides. More particularly, it relates to a continuous, solid-phase polymerization process for increasing the molecular weight of polyamide granules by controlled heating of the granules while the granules are uncompacted and then heating the granules to temperatures greater than 200°C. with an inert gas in a plug-flow, gravity-conveyed reaction zone, whereby the increase in molecular weight is accomplished without mechanical agitation or fluidization of the granules in the reaction vessel.

BACKGROUND OF THE INVENTION

The polymerization of polyamides in the solid phase to increase molecular weight has been practiced for a number of years. However, prior art teaches that the solid-phase polymerization be carried out below 200°C. or in mechanically agitated vessels or fluidized beds when the polymerization temperature is in excess of 200°C.

U.S. Pat. No. 3,379,696 sets forth a batch process for solid-phase polymerization of polyamides. A closed vessel under agitation is subjected to heat in order to increase the molecular weight of the polyamide contained within the vessel. U.S. Pat. No. 3,562,206 describes a solid-phase polymerization process for producing polyhexamethylene adipamide having a weight average molecular weight above 100,000 by heating lower molecular weight polymer at temperatures between 130°C. and 200°C. These patents exemplify some of the many solid-phase polymerization techniques for increasing the molecular weight of polyamides.

Generally, in trying to increase the molecular weight of polyamides in a more economical manner a continuous process is desirable. However, agitation in the form of mechanical agitation, fluidization, spouting of similar means is undesirable in a continuous process because it would contribute to variable holdup times in the reaction vessel and thus cause variability from granule to granule in the average molecular weight. If some granules are heated for excessive periods, as could well be the case with an agitated continuous process, poor quality due to gel, could be expected in the end-use application. Prior to the invention herein set forth, when agitation is not used and the resin is heated above 200°C., where polymerization rates are greatly accelerated, agglomeration of the polyamide granules occurs. These considerations heretofore prevented the development of an effective, low-cost process for increasing the molecular weight of polyamides in a continuous, solid-phase polymerization at temperature over 200°C.

It has now been discovered that the probelm of agglomeration of resin granules in a plug-flow, gravity-conveyed, solid-phase polymerizer can be overcome by the expedient of heating the granules, while they are uncompacted, to a preselected temperature and then processing the preheated granules in the plug-flow, gravity-conveyed, solid-phase polymerization zone. The temperature to which granules must be heated prior to confinement in the polymerization zone will vary for each type of polyamide. In the case of polyhexamethylene adipamide, the temperature which the granules must be heated prior to confinement in the polymerization zone is between 150° and 200°C., polyhexamethylene sebacamide must be heated to between 135° and 185°C., polycaprolactam between 170° and 205°C., polyhexamethylene dodecanediamide between 140° and 185°C., and a copolymer of polyhexamethylene adipamide and epsilon caprolactam containing 77.5 wt. percent polyhexamethylene adipamide and 22.5 wt. percent epsilon caprolactam between 155° and 200°C. The preselected temperature will be within the range of 135°C. to 205°C. for all the polyamides useful in this invention.

The polyamide molding granules may be heated in the uncompacted condition as the top layer in the top of the solid phase, gravity conveyed, plug flow polymerizer, or they may be heated in a separate zone, and then added to the polymerizer.

In the drawing which shows one of the many types of apparatus suitable for carrying out the invention, an input line 1 is shown, whereby polyamide molding granules are added to an open or closed reaction vessel 9. The granules can be added at room temperature or already preheated. The inert gas supply 3 is pumped 4 into the reaction vessel through a perforated conical shape distributor screen 2 which provides uniform distribution of the gas throughout the bed of polyamide granules in the vessel. The temperature of the gas is controlled by the heater 5 through which the inert gas passes just prior to entering the vessel. The flow of gas is controlled by means of valve 6 and exits the vessel through line 7. The polymer drawoff from the reaction vessel is controlled by a rotary valve or like valve positioned prior to the exit 8.

Optionally, the inlet gas supply 3 can be partially obtained from a recirculation of this gas. Such recirculated gas should be cleansed of oligomers.

No mechanical agitation is provided in the reaction vessel. Gas flow is maintained low enough to preclude fluidization of the bed of granules. The only motion encountered in the reaction vessel is the downward vertical flow of granules. Granules are drawn off at 8 at a predetermined rate dependent on operating temperature and residence time required to provide the desired increase in molecular weight. Granules are added at 1 at the same rate as they are removed through 8 to maintain a constant height of granules in 9.

The invention is an effective and inexpensive process for increasing the average molecular weight of various polyamides and producing a molding granule product in which the variation in the average molecular weight from granule to granule is quite small. An increase in average molecular weight is noted conveniently by an increase in relative viscosity (RV) or in the case of polyamides that are not soluble in formic acid by an increase in inherent viscosity (IV).

Number average molecular weight ($\overline{M}_n$) for a linear 6,6 nylon may be calculated by dividing $2 \times 10^6$ by the sum total of end groups (expressed in equivalents/$10^6$ grams of polymer) in the subject polyamide. The relationship of RV to the total end groups and number average molecular weight of a linear 6,6 nylon having normal molecular weight distribution is shown by the following table.

TABLE I

| RV | Total End Groups Equivalent/$10^6$ Grams | Number Average Molecular Weight $\overline{M}n$ |
|---|---|---|
| 50 | 116 | 17,200 |
| 100 | 88 | 22,700 |
| 150 | 76 | 26,400 |
| 200 | 68 | 29,400 |
| 250 | 62 | 32,300 |

RV is measured and calculated in accordance with the method described in ASTM specification D-789-62T, using 8.4 weight percent of polyamide resin dissolved in 90 percent formic acid.

For polyhexamethylene dodecanediamide inherent viscosity (IV) is measured in an m-cresol solution (0.5 grams polymer in 100 ml solvent) at 25°C. using an Ostwald-Fenske viscometer. The IV is calculated as follows:

$$IV = 2.303 \log_{10} \eta_r/C$$

where:
$\eta_r = t_s/t_c$
$t_s$ = average efflux time for sample solution
$t_c$ = average efflux time for solvent
$C$ = concentration, g. polymer/100 ml solvent.

In carrying out the invention one would conveniently start with a polyamide having a relatively low RV, i.e., one having an RV of 35 or even lower. However, the starting granules can be any convenient RV. The preferred starting RV is about 42–52. The starting material is in the form of molding granules, such as a right cylinder having dimensions of approximately 90 × 90 mils. However, most conventional sizes and shapes of molding granules, as known by the art, can be employed.

The polyamides or nylons employed in this invention are 6,6-nylon made from hexamethyl enediamine and adipic acid, 6-nylon made from ε-caprolactam or aminocaproic acid, 6,10-nylon made from hexamethylenediamine and sebacic acid, 6,12nylon made from hexamethylenediamine and dodecanedioic acid and copolymers having melting points greater than 200°C. made from the aforementioned starting materials.

The process increases the RV of the aforesaid polyamides up to several hundred PV units merely by extending the holdup time of the polyamide holding granules in the reaction vessel at temperatures above 200°C. without mechanical agitation or fluidization of the granules to prevent agglomeration during continuous addition and withdrawal of the granules. The preferred embodiment is an increase of RV up to the range of 150 to 300 RV units.

After the polyamide molding granules have attained the preselected temperature and are in the reaction vessel, granules are withdrawn from the bottom of the vessel continuously and feed granules are added at the top of the reaction vessel at the same rate to maintain bed height. Drawoff at the bottom of the vessel promotes downward vertical flow of the bed of granules due to gravity but does not cause mixing of resin within the bed. This uniform flow of each layer of polymer in the bed allows the residence time of each granule in the reactor to be about the same. This results in the polymerization reaction being carried out to the same extent in each granule and thereby avoids wide variation in molecular weight from granule to granule as found in many prior art processes.

As soon as drawoff of resin is started the temperature of the heating gas is raised so as to increase the temperature of the resin bed to in excess of 200°C. and in excess of the preselected temperature, but not in excess of about 15°C. below the crystalline melting point of the polyamide granules. It is preferred to use a temperature of between 225° and 240°C. for 6,6-nylon. The RV of the polyamide removed from the bottom of the reaction vessel is dependent on residence time in the reaction vessel and temperature of the resin as is well known to those skilled in the art. The granules drawn off from the reaction vessel during the heatup to the required operating temperature will have a lower RV than the product obtained at steady state operation. These transition granules can be discarded or recycled. When the required operating temperatures are established throughout the granule bed, RV will depend on residence time, and as long as steady operating conditions are maintained product of uniform RV will be obtained. A continuous operation at temperatures above 200°C. will result without need for mechanical agitation or fluidization of the granules to prevent agglomeration.

The gas used to heat the granules in the reaction vessel can be any gas inert to polyamide granules. Examples of suitable gases are nitrogen, carbon dioxide and helium. Nitrogen is preferred. The temperature of the gas is adjusted to give the required polymer temperature. However, the temperature of the polymer is the controlling temperature in preventing agglomeration of granules. Preferably the inert gas is substantially free of moisture. The hotter and drier the inert gas, the more rapidly will the molecular weight of the polymer be increased. While the rate of reaction will clearly be higher when a stream of dry, hot inert gas is passed only once through the reaction vessel, it is cheaper to recirculate part of the inert gas, although this naturally results in a higher moisture content in the gas and thus a lower rate of reaction.

The rate of drawoff will, of course, determine the holdup time in the reaction vessel. The longer the polyamide molding granules are in the reaction vessel at a temperature above 200°C. the higher will be the RV of the granules withdrawn. Another variable is the temperature of the polyamide molding granules in the reaction vessel. If the inert gas temperature raises the temperature of the granules to say 210°C., the holdup time required to give a specific RV will be longer than if the temperature in the reaction vessel for 6,6-polyamide granules is closer to 245°C. The choice of operating temperature above 200°C. can be made by anyone having ordinary skill in the polymerization art. Usually, residence time of 1 to 15 hours will suffice for operation of this process.

Another variable in the holdup time to produce a desired molecular weight is the use of a catalyst incorporated in the polyamide molding granules. The use of a proper catalyst will diminish the vessel holdup time or residence time required to reach the desired RV. Such a catalyst should be present at a concentration of at least 10 parts by weight of catalyst per million parts by weight of polyamide granule. Acceptable catalysts include phosphoric acid, phenyl phosphinic acid and sodium hypophosphite.

End group imbalance can affect molecular weight and molecular weight distribution. The rate of solid-phase polymerization is inversely proportional to the end group imbalance; consequently, the highest polymerization rate is obtained when the end groups are balanced.

It is important that oxygen be excluded from the whole polymerization and cooling system, if employed, since oxygen reacts with the polymer causing degradation characterized by a yellowness in the final product.

The following additional examples are set forth to show the invention in still greater detail.

EXAMPLE 1

A vessel as shown in the drawing is employed. It is about 3.96 meters high and about 40.6 centimeters in diameter. The rotary valve used has a discharge rate of about 1.36 kg/min. as measured by collecting and weighing a sample, generally over a one-minute period. In order to adjust overall flow rate to the desired value, the valve is operated intermittently. Temperatures are measured by thermocouples set in the walls of the vessel and recorded continuously. The nitrogen is recycled and filtered to remove extracted oligomers. A nitrogen purge and make-up rate of 10 percent is used to maintain the moisture level of the hot $N_2$ at a low level. The empty vessel is preheated using nitrogen gas flowing at a net rate of about 47.2 liters/sec. and a temperature of about 190°C. until the temperature recorded in the vessel is from 160°–175°C. Nylon 66 polymer granules of about RV 50 are then fed into the top of the vessel until a height of 3.35 meters is reached. This requires about 1 ½ hours during which heating of the granules occurs. After a further 1¼ hours, the polymer bed temperature varies from 165°C. at the top to about 178°C. near the nitrogen inlet. The rotary valve is started at this point. Polymer is fed to the reactor at about 25°C. by a dip tube to maintian the height. After a period of adjustment and checking of flow rates, the nitrogen inlet temperature is raised to 230°C. This is about 11 hours after the start of the nitrogen preheat. After a further 6 hours, a steady state condition is established and RV measurements are made on the product every few hours for 5 days. During this period, product takeoff is controlled by operating the rotary valve as stated above. Polymer bed temperatures range from 225°C. at the bottom to 210°C. near the top of the bed. By the second hour of the fifth day of operation the RV measurement is about 155. By the third hour of the fifth day it rises to about 160 and thereafter varies between 165 and 175 for the duration of this last stage of operation. In the last stage of operation, $N_2$ temperature is increased to 235°C. and the drawoff rate is equal to 0.83 kg/min. The nitrogen was fed into the polymerization zone at about 4 psig.

The product is discharged hot (225°C.) into air and severely discolors. Proper handling and cooling of the material is described in the following example. Product color is also unacceptable due to high oxygen levels (0.1 percent) in the recycled nitrogen.

EXAMPLE 2

A stainless steel vessel approximately 6.10 meters high by 1.52 meters in diameter is divided into an upper reactor portion and a lower cooler portion by a gas distributing device placed approximately 2.13 meters from the base of the vessel. The reactor is equipped with two inert gas conveying systems, one to provide hot gas to the reactor section and the other cool gas to the cooling section.

Using conventional engineering techniques, the gas distributing device is designed to provide uniform gas distribution and plug flow of the whole bed of granules downward. Temperature of the polymer bed is estimated from the temperature of the inlet gas, the residence time and the gas flow rate being such that the exit polymer temperature is not less than 1° – 2°C. below the temperature of the gas.

Under steady state conditions, the relative viscosity of the product removed from the cooler is controlled by adjusting the hot nitrogen gas flow rate and temperature with a constant plug flow rate of polymer through the reactor and cooler of 5.67 kg/minute. A level sensing device controls the polymer takeoff rate to insure a constant bed height.

The cooling portion of the vessel, equipped with a gas distributor, is maintained with a flow rate of nitrogen through the system of 330.4 liters/sec. to attain a temperature of 30° to 40°C. before discharging to the atmosphere to prevent discoloration of the granules.

To start up and preheat the polymer granules, the reactor portion of the empty vessel is heated with a nitrogen flow rate of about 330.4 liters/sec. at a temperature of 175°C. until the exit gas temperature is about 150°C. Nitrogen recirculation in the cooler portion is about the same flow rate, so that the temperature in the cooler is maintained between 30° and 40°C. Polymer granules of polyhexamethylene adipamide are then added to the top of the vessel at a rate of 5.67 kg/min. which is maintained until the cooler portion is filled. For convenience, the addition rate is then set at 9.07 kg/min. and the filling continued until the bed height in the reactor portion of the vessel reaches 3.35 meters. Once the polymer bed height in the reactor section reaches 3.35 meters, the polymer addition rate is reduced to 5.67 kg/min., the gas temperature is raised above 200°C. and the polymer bed height controlled at this level by means of the sensing device.

During a lengthy period of operation with occasional "upsets" for heater equipment maintenance and similar problems, polymer flow is never interrupted for more than 10 to 15 minutes and several periods of steady state operation are achieved. The results of these steady state operations are shown in Table II. The effect on product molecular weight of nitrogen temperature and flow rate and initial polymer molecular weight is apparent. The product granules are white and glossy.

TABLE II

| STATE | DURATION HOURS | POLYMER | | | NITROGEN | | |
|---|---|---|---|---|---|---|---|
| | | RATE kg/min. | INLET RV | PRODUCT RV | INLET TEMP. °C. | FLOW RECIRC. liters/sec. | MAKE-UP liters/sec. |
| 1 | 40 | 5.67 | 51.5 | 230 | 205 | 306.8 | 66.1 |
| 2 | 16 | 5.67 | 42.8 | 206 | 215 | 259.6 | 66.1 |
| 3 | 12 | 5.67 | 42.7 | 239 | 220 | 306.8 | 85.0 |

EXAMPLE 3

A cylindrical column 5.5 centimeters in diameter and about 25.4 centimeters long is used as a static bed reactor. The bottom of the cylinder is flanged and attached to a conical section. A 200 mesh screen is used between the conical section and the bottom of the cylinder as a resin support screen. Heated nitrogen gas is introduced at the bottom of the reactor at a rate of 0.7 liters/sec. 150 Grams of 6,6-nylon preheated in an oven for 30 minutes at 175°–180°C. are charged to the reactor preheated by the nitrogen gas. Nitrogen gas flow is continued at the same rate for 135 minutes. After 15 minutes the polymer temperature reaches 236°C. and remains steady between 236°–238°C. for the following 120 minutes. Temperatures are measured by thermocouples in the gas stream and polymer bed.

After cooling the reactor is dismantled. The resin is free-flowing and shows no agglomeration.

EXAMPLE 4

A layer no more than one-fourth inch thick of 150 grams of polyhexamethylene sebacamide molding granules was placed in an aluminum pan and heated in an oven for 40 minutes at a temperature from between 143° to 160°C., and then transferred to the cylindrical column described in Example 3. The cylindrical column had three thermocouples. Thermocouple 1 was one-fourth inch below the support screen and measured the temperature of the incoming nitrogen. Thermocouple 2 was located in the molding granules about one-fourth inch above the support screen, and thermocouple 3 was located in the molding granules about one-half inch below the top surface of the bed. The following Table shows the temperature profile of the column during the polymerization run.

| Elapsed time minutes | Observed temperatures | | |
|---|---|---|---|
| | T.C. 1 | T.C. 2 | T.C. 3 |
| After transfer (ca. 1 min) | 210 | 173 | 155 |
| 5 | 214 | 194 | 162 |
| 10 | 214 | 198 | 166 |
| 15 | 215 | 200 | 177 |
| 20 | 216 | 202 | 183 |
| 25 | 216 | 203 | 186 |
| 30 | 216 | 203 | 188 |
| 35 | 217 | 203 | 190 |
| 40 | 217 | 203 | 190 |
| 50 | 217 | 203 | 192 |
| 60 | 216 | 203 | 192 |
| 75 | 218 | 204 | 192 |
| 90 | 217 | 204 | 192 |
| 105 | 218 | 204 | 192 |
| 120 | 218 | 204 | 192 |
| 135 | 217 | 204 | 192 |

After 135 minutes the heat was turned off and the bed allowed to cool in nitrogen flow. After cooling, the reactor was dismantled at the support screen. The polymer was allowed to flow slowly from the reactor and inspected for evidence of agglomeration. There was no agglomeration.

EXAMPLE 5

Using the apparatus described in Example 3 with the thermocouples located as described in Example 4, 150 grams of polyhexamethylene dodecanedioamide was heated in an aluminum pan to 160°–170°C. for 30 minutes in an oven. The following Table shows the temperature profile of the column during the polymerization run:

| Elapsed time minutes | Observed temperatures °C. | | |
|---|---|---|---|
| | T.C. 1 | T.C. 2 | T.C. 3 |
| 0 | 205 | 186 | 135 |
| 5 | 210 | 196 | 170 |
| 10 | 212 | 199 | 176 |
| 15 | 215 | 202 | 184 |
| 20 | 216 | 203 | 187 |
| 25 | 215 | 204 | 194 |
| 30 | 217 | 204 | 195 |
| 35 | 217 | 204 | 195 |
| 40 | 217 | 204 | 198 |
| 50 | 217 | 204 | 198 |
| 60 | 217 | 204 | 198 |
| 75 | 217 | 204 | 198 |
| 90 | 216 | 204 | 198 |
| 105 | 216 | 204 | 198 |
| 120 | 216 | 204 | 198 |
| 135 | 216 | 204 | 198 |

Polymer was cooled as in Example 4 and examined as in Example 4. No agglomeration of the molding granules occurred.

Using the same apparatus, but without heating the molding granules before adding them to the column, the following temperature profile was obtained:

| Elapsed time minutes | Observed temperature °C | | |
|---|---|---|---|
| | T.C. | T.C. 2 | T.C. 3 |
| 0 | 24 | 24 | 25 |
| 5 | 190 | 140 | 35 |
| 10 | 210 | 170 | 70 |
| 15 | 210 | 187 | 110 |
| 20 | 209 | 190 | 135 |
| 25 | 210 | 190 | 155 |
| 30 | 209 | 190 | 170 |
| 35 | 208 | 190 | 170 |
| 40 | 207 | 190 | 175 |
| 50 | 207 | 190 | 180 |
| 60 | 207 | 190 | 180 |
| 75 | 207 | 190 | 180 |
| 90 | 207 | 190 | 180 |
| 105 | 207 | 190 | 180 |
| 120 | 207 | 190 | 180 |
| 135 | 207 | 190 | 180 |

The resin was cooled and examined as in Example 4, and it was agglomerated.

EXAMPLE 6

Using the same equipment as Example 5 a polyamide copolymer of polyhexamethylene adapamide and caprolactam, containing 77.5 parts of polyhexamethylene adipamide and 22.5 parts of caprolactam were heated in an oven at 168° – 180°C. for thirty minutes and then transferred to the cylindrical polymerizer which had been preheated to 200° – 210°C. The following Table shows the temperature profile of the column during the polymerization run:

| Elapsed time minutes | Observed temperatures °C. | | |
|---|---|---|---|
| | T.C. 1 | T.C. 2 | T.C. 3 |
| 0 | 222 | 186 | 155 |
| 5 | 224 | 206 | 170 |
| 10 | 224 | 210 | 185 |
| 15 | 223 | 210 | 195 |
| 20 | 224 | 210 | 198 |
| 25 | 224 | 210 | 200 |
| 30 | 224 | 210 | 202 |
| 35 | 224 | 210 | 202 |
| 40 | 224 | 210 | 202 |
| 50 | 224 | 210 | 202 |
| 60 | 224 | 210 | 202 |
| 75 | 224 | 210 | 202 |
| 90 | 224 | 210 | 202 |
| 105 | 224 | 210 | 202 |
| 120 | 224 | 210 | 202 |
| 135 | 224 | 210 | 202 |

The polymer was cooled as in Example 4 and examined for agglomeration. No agglomeration was observed.

In a similar run using the same starting copolymer but without heating the molding granules before adding them to the polymerization column, the following temperature profile was obtained:

| Elapsed time minutes | Observed temperatures °C. | | |
|---|---|---|---|
| | T.C. 1 | T.C. 2 | T.C. 3 |
| 0 | 24 | 24 | 25 |
| 5 | 208 | 172 | 50 |
| 10 | 220 | 198 | 110 |
| 15 | 223 | 210 | 160 |
| 20 | 224 | 210 | 180 |
| 25 | 223 | 210 | 187 |
| 30 | 223 | 210 | 190 |
| 35 | 223 | 210 | 195 |
| 40 | 223 | 210 | 198 |
| 50 | 223 | 210 | 198 |
| 60 | 223 | 210 | 198 |
| 75 | 223 | 210 | 198 |
| 90 | 223 | 210 | 200 |
| 105 | 223 | 210 | 200 |
| 120 | 223 | 210 | 200 |
| 135 | 223 | 210 | 200 |

After cooling the resin as in Example 4, the molding granules were examined and found to have agglomerated.

EXAMPLE 7

Using the same equipment as Example 5, a polycaprolactam was heated in an oven for 30 minutes at 165°–182°C. Then it was transferred to the reactor that had been preheated to 194°–205°C. The following Table shows the temperature profile of the column during the polymerization run:

| Elapsed time minutes | Observed temperatures °C. | | |
|---|---|---|---|
| | T.C. 1 | T.C. 2 | T.C. 3 |
| 0 | 194 | 178 | 141 |
| 5 | 218 | 202 | 175 |
| 10 | 220 | 207 | 187 |
| 15 | 219 | 208 | 197 |
| 20 | 219 | 208 | 201 |
| 25 | 219 | 208 | 201 |
| 30 | 219 | 208 | 201 |
| 35 | 219 | 208 | 202 |
| 40 | 219 | 208 | 202 |
| 50 | 219 | 208 | 202 |
| 60 | 219 | 208 | 202 |
| 75 | 219 | 208 | 202 |
| 90 | 219 | 208 | 202 |
| 105 | 219 | 208 | 202 |
| 120 | 219 | 208 | 202 |
| 135 | 220 | 208 | 202 |

The resin was then cooled as in Example 4, and examined for agglomeration. None was observed.

In a similar run at using the same polymer, but without heating the molding granules prior to adding them to the reactor, the following temperature profile was obtained:

| Elapsed time minutes | Observed temperatures °C. | | |
|---|---|---|---|
| | T.C. 1 | T.C. 2 | T.C. 3 |
| 0 | 25 | 24 | 25 |
| 5 | 200 | 167 | 76 |
| 10 | 210 | 190 | 145 |
| 15 | 215 | 200 | 180 |
| 20 | 217 | 205 | 190 |
| 25 | 217 | 206 | 195 |
| 30 | 217 | 206 | 198 |
| 35 | 217 | 206 | 198 |
| 40 | 217 | 206 | 201 |
| 50 | 217 | 206 | 202 |
| 60 | 217 | 206 | 202 |
| 75 | 217 | 206 | 202 |
| 90 | 217 | 206 | 202 |
| 105 | 217 | 206 | 202 |
| 120 | 217 | 206 | 202 |
| 135 | 217 | 206 | 202 |

The resin was cooled and examined as in Example 4, and it was agglomerated.

I claim:

1. A process for the production of unagglomerated molding granules of high molecular weight saturated aliphatic polycarbonamide from saturated aliphatic polycarbonamide molding granules having a lower molecular weight which comprises:

a. heating molding granules of said saturated aliphatic polycarbonamide having a lower molecular weight wherein the polycarbonamide is selected from the class consisting of polyhexamethylene adipamide, polyhexamethylene sebacamide, polycaprolactam, polyhexamethylene dodecanediamide, and a copolymer of polyhexamethylene adipamide and epsilon caprolactam to a preselected temperature within the range 135°C. to 205°C. without agitation while said granules are free to expand thermally, b. passing said heated granules through a plugflow, gravity-conveyed reaction zone wherein the granules are heated by a countercurrently flowing inert gas to a temperature that is both in excess of 200°C. and in excess of said preselected temperature but not in excess of about 15°C. below the crystalline melting point of said polycarbonamide, c. and recovering from said reaction zone, unagglomerated saturated aliphatic polycarbonamide molding granules having a higher molecular weight than those heated in step (a).

2. The process of claim 1 in which the preselected temperature is between
 a 150 and 200°C. when the polycarbonamide is polyhexamethylene adipamide,
 b 135° and 185°C. when the polycarbonamide is polyhexamethylene sebacamide,
 c 170° and 205°C. when the polycarbonamide is polycaprolactam,
 d 140° and 185°C. when the polycarbonamide is polyhexamethylene dodecanediamide, and
 e 155° and 200°C. when the polycarbonamide is a copolymer of polyhexamethylene adipamide and epsilon-caprolactam.

3. The process of claim 2 in which the lower molecular weight polycarbonamide is heated to said preselected temperature prior to said granules passing into the plug flow, gravity conveyed reaction zone.

4. The process of claim 2 in which the lower molecular weight polycarbonamide is heated to said preselected temperature when it is the top layer in the plug flow, gravity conveyed reaction zone.

5. The process of claim 3 in which the lower molecular weight polycarbonamide is heated to said preselected temperature by heated inert gas.

6. The process of claim 5 in which the inert gas is nitrogen.

7. A plug flow process for the production of unagglomerated molding granules of high molecular weight saturated aliphatic polycarbonamide from saturated aliphatic polycarbonamide molding granules having a lower molecular weight which comprises:
 a. adding a layer of molding granules of said saturated aliphatic polycarbonamide having a lower molecular weight wherein the polycarbonamide is selected from the class consisting of polyhexamethylene adipamide, polyhexamethylene sebacamide, polycaprolactam, polyhexamethylene dodecanediamide, and a copolymer of polyhexamethylene adipamide and epsilon caprolactam into the top of a gravity-conveyed, partially filled reaction zone, the volume of the added layer of polycarbonamide molding granules being less than the volume necessary to fill said partially filled reaction zone,
 b. heating said added layer of polycarbonamide molding granules without agitation to a preselected temperature within the range of 135°C. to 205°C. while said layer exists as the top layer of the contents of the reaction zone by continuously passing a heated inert gas upwardly through said reaction zone, said heated inert gas having a temperature when it enters the bottom of the reaction zone higher than said preselected temperature but less than about 15°C. below the crystalline melting point of said polycarbonamide whereby agglomeration is prevented,
 c removing the portion of the contents of said reaction zone adjacent the bottom of the reaction zone unagglomerated from said reaction zone, which portion is at a temperature that is both in excess of 200°C. and said preselected temperature but not in excess of about 15°C. below the crystalline melting point of the polycarbonamide,
 d. adding a layer of said polycarbonamide molding granules having said lower molecular weight into the top of said reaction zone over the top of the previously added polycarbonamide layer, the volumetric amount of added polycarbonamide molding granules being such that the total solid volume of the contents of the reaction zone remains substantially constant,
 e. repeating steps (b), (c) and (d) above,
 f and recovering from the bottom of the reaction zone unagglomerated saturated aliphatic polycarbonamide molding granules having a higher molecular weight than those heated in step (a).

8. The process of claim 7 in which the polycarbonamide is polyhexamethylene adipamide.

9. The process of claim 8 in which the molding granules are heated in the reaction zone to a temperature between 225°C. and 240°C.

10. The process of claim 9 in which the residence time of the molding granules in the reaction zone is at least 2 hours.

* * * * *